(12) United States Patent
Vick, Jr. et al.

(10) Patent No.: US 8,453,749 B2
(45) Date of Patent: Jun. 4, 2013

(54) CONTROL SYSTEM FOR AN ANNULUS BALANCED SUBSURFACE SAFETY VALVE

(75) Inventors: James D. Vick, Jr., Dallas, TX (US); Jimmie R. Williamson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1137 days.

(21) Appl. No.: 12/040,110

(22) Filed: Feb. 29, 2008

(65) Prior Publication Data
US 2009/0218096 A1 Sep. 3, 2009

(51) Int. Cl.
*E21B 34/10* (2006.01)

(52) U.S. Cl.
USPC .......................................... 166/374; 166/319

(58) Field of Classification Search
USPC .................. 166/53, 72, 386, 332.8, 316, 319, 166/332.1, 373, 374, 375
See application file for complete search history.

(56) References Cited

U.S. PATENT DOCUMENTS

| | | | | |
|---|---|---|---|---|
| 4,621,695 A | | 11/1986 | Pringle | |
| 5,101,904 A | * | 4/1992 | Gilbert | 166/319 |
| 5,251,702 A | * | 10/1993 | Vazquez | 166/324 |
| 5,293,551 A | * | 3/1994 | Perkins et al. | 361/154 |
| 5,526,883 A | | 6/1996 | Breaux | |
| 5,897,095 A | | 4/1999 | Hickey | 251/57 |
| 6,237,693 B1 | * | 5/2001 | Deaton | 166/375 |
| 6,491,106 B1 | * | 12/2002 | Simonds | 166/375 |
| 6,619,388 B2 | * | 9/2003 | Dietz et al. | 166/66.7 |
| 6,679,332 B2 | * | 1/2004 | Vinegar et al. | 166/373 |
| 6,851,481 B2 | * | 2/2005 | Vinegar et al. | 166/374 |
| 6,988,556 B2 | | 1/2006 | Vick, Jr. | |
| 7,434,626 B2 | * | 10/2008 | Vick, Jr. | 166/373 |
| 2003/0150619 A1 | | 8/2003 | Meaders | |
| 2003/0155131 A1 | | 8/2003 | Vick | |
| 2004/0084189 A1 | * | 5/2004 | Hosie et al. | 166/386 |
| 2006/0076149 A1 | * | 4/2006 | McCalvin | 166/386 |
| 2007/0272415 A1 | | 11/2007 | Ratliff | |
| 2008/0157014 A1 | | 7/2008 | Vick | |

FOREIGN PATENT DOCUMENTS

| | | | |
|---|---|---|---|
| EP | 1236662 A2 | | 9/2002 |
| EP | 1236862 | * | 9/2002 |
| EP | 1241322 | * | 9/2002 |
| EP | 1241322 A1 | | 9/2002 |
| GB | 2175628 | * | 12/1986 |
| GB | 2175628 A | | 12/1986 |
| WO | 0112950 A1 | | 2/2001 |
| WO | WO 01/12950 | * | 2/2001 |

* cited by examiner

OTHER PUBLICATIONS

European Search Report issued Oct. 24, 2011 for European Patent Application No. 09153647, 9 pages.

*Primary Examiner* — Jennifer H Gay
*Assistant Examiner* — Blake Michener
(74) *Attorney, Agent, or Firm* — Smith IP Services, P.C.

(57) ABSTRACT

A control system for an annulus balanced subsurface safety valve. A system for operating a safety valve in a well includes a piston of the safety valve being responsive to displace due to a pressure differential between chambers exposed to the piston; and a valve controller which alternately exposes at least one of the chambers to pressure in an annulus surrounding the safety valve, and to pressure greater than that in the annulus. A method of operating a safety valve in a well includes the steps of: opening the safety valve by biasing a piston of the safety valve to displace in response to a pressure differential between a chamber exposed to pressure greater than well pressure, and another chamber exposed to well pressure; and closing the safety valve by exposing both of the chambers to the well pressure.

20 Claims, 10 Drawing Sheets

CONTROL SYSTEM FOR AN ANNULUS BALANCED SUBSURFACE SAFETY VALVE

BACKGROUND

The present disclosure relates generally to equipment utilized and operations performed in conjunction with subterranean wells and, in an embodiment described herein, more particularly provides a control system for an annulus balanced subsurface safety valve.

A typical subsurface safety valve can be annulus-balanced, that is, one side of a piston of an actuator in the safety valve is exposed to pressure in an annulus surrounding the safety valve. In this type of safety valve, pressure is applied via a control line to an opposite side of the piston to displace the piston after overcoming a biasing force applied by a spring or other biasing device.

However, closing the valve requires that the fluid column in the control line be lifted by the biasing device. Thus, the biasing device must exert a large biasing force if the safety valve is set very deep in a well. In order to overcome this large biasing force, substantial pressure must be applied to the control line to open the valve. This requires a corresponding substantial pressure differential be applied across the piston. Also, flowing the fluid through the long control line takes substantial time when the valve is to be closed.

From the foregoing, it is apparent that improvements are needed in the art of controlling operation of a subsurface safety valve.

SUMMARY

In the present specification, systems and methods are provided which solve at least one problem in the art. One example is described below in which a safety valve is operated utilizing well pressure in an annulus surrounding the safety valve. Another example is described below in which a valve controller alternately connects a piston chamber of the safety valve to well pressure or to a pressurized fluid source.

In one aspect, a system for operating a safety valve in a subterranean well is provided. The system includes a piston of the safety valve which displaces in response to a pressure differential between chambers exposed to the piston. A valve controller alternately exposes at least one of the chambers to pressure in an annulus surrounding the safety valve, and to pressure greater than that in the annulus.

In another aspect, a method of operating a safety valve in a subterranean well is provided which includes the steps of: opening the safety valve by biasing a piston of the safety valve to displace in response to a pressure differential between a chamber exposed to pressure greater than a pressure in the well, and another chamber exposed to the well pressure; and closing the safety valve by exposing both of the chambers to the well pressure.

In yet another aspect, a system for operating a safety valve in a subterranean well includes a piston of the safety valve displaceable in response to a pressure differential between chambers exposed to the piston. At least one chamber is connected to a valve controller, and another chamber is connected to a well pressure. The valve controller is also connected to the well pressure, and to a pressurized fluid source which supplies pressure greater than that of the well pressure. The valve controller is operative to alternately connect the first chamber to the well pressure and to the pressurized fluid source, to thereby alternately open and close the safety valve.

These and other features, advantages, benefits and objects will become apparent to one of ordinary skill in the art upon careful consideration of the detailed description of representative embodiments hereinbelow and the accompanying drawings, in which similar elements are indicated in the various figures using the same reference numbers.

DETAILED DESCRIPTION

It is to be understood that the various embodiments described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
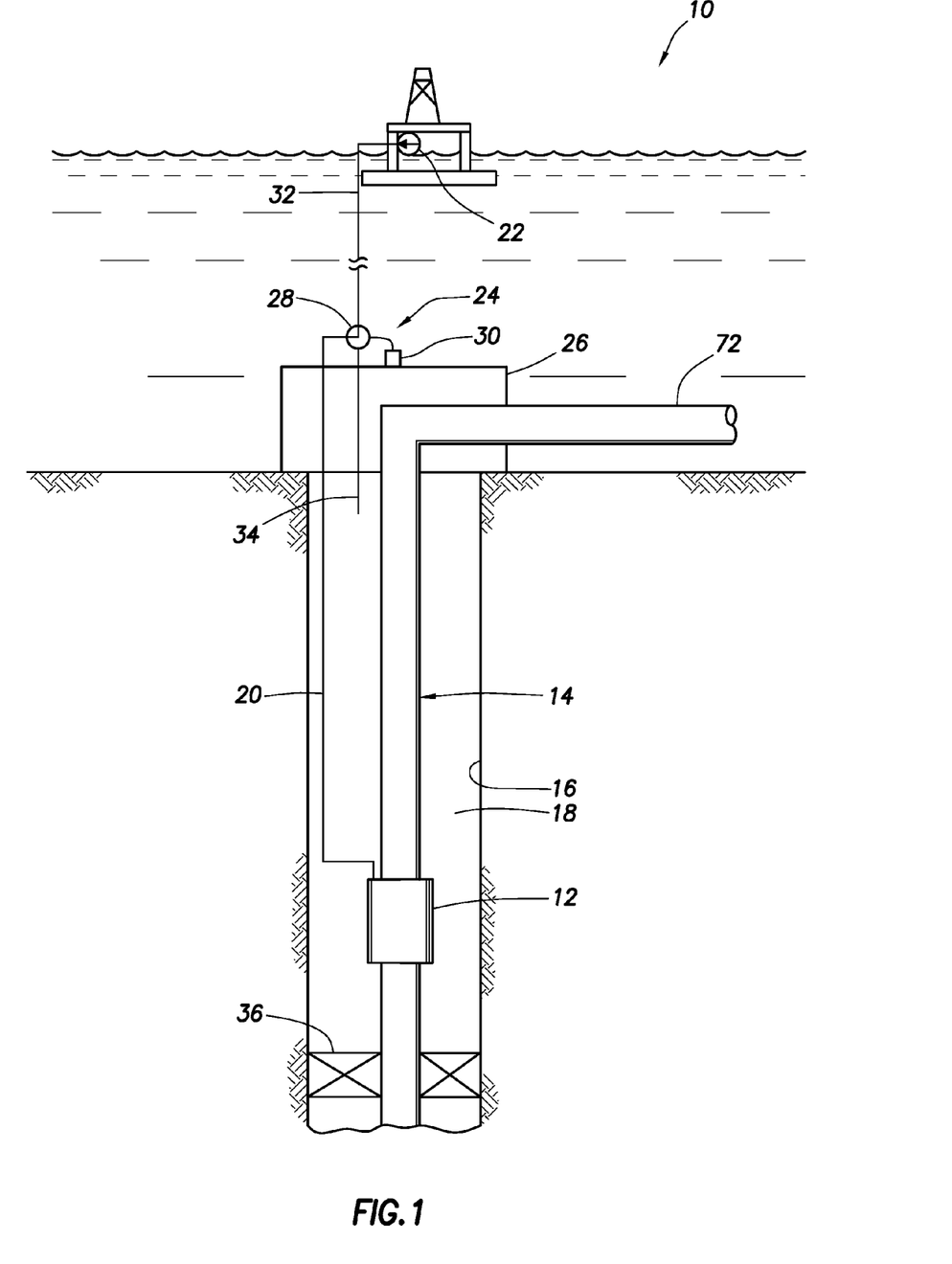
FIG. 1 is a schematic partially cross-sectional view of a well system embodying principles of the present disclosure.

Representatively illustrated in FIG. 1 is a system 10 and associated method which embody principles of the present disclosure. In the system 10, a safety valve 12 is interconnected as part of a tubular string 14 and installed in a wellbore 16. An annulus 18 is thereby formed between the tubular string and the wellbore 16.

The safety valve 12 is preferably of the type known as an annulus-balanced safety valve, in that an actuator for the safety valve includes a piston having one side exposed to pressure in the annulus 18. An opposite side of the piston is exposed to pressure in a line 20 extending to a remote location. Examples of such annulus-balanced safety valves are described more fully below.

The safety valve 12 is also preferably of the type which fails closed, that is, when sufficient pressure is not present in the line 20, the valve closes due to force exerted by a biasing device (such as a spring or pressurized gas chamber, etc.). To open the safety valve 12, sufficient pressure must be applied to the line 20 to overcome the biasing force exerted by the biasing device, and to displace the piston and open a closure device of the valve. For an annulus-balanced safety valve, the pressure applied to the line 20 to open the safety valve is generally greater than pressure in the annulus 18 surrounding the safety valve.

In contrast to typical annulus-balanced safety valve systems, the system 10 does not have the line 20 connected directly to a pressure source 22 for pressurizing the line and opening the safety valve 12. Instead, the line 20 is connected to a valve controller 24 which, in the illustrated example, may be part of a subsea control module positioned at a subsea wellhead and Christmas tree 26.

However, it should be clearly understood that it is not necessary for the principles of the present disclosure to be used only in conjunction with subsea wells. The principles of this disclosure may also be used with land-based wells, and with wells at any other location.

The pressure source 22 is depicted in FIG. 1 as being a pump located on a floating rig. However, other types of pressure sources (such as pressurized gas sources, etc.) may be used, and the pressure source may be located on land or on another type of rig, in keeping with the principles of this disclosure.

The valve controller 24 preferably includes a valve module 28 and a control module 30. The control module 30 may not be used in some examples described below. Note that the valve and control modules 28, 30 are conveniently accessible for maintenance or repair on an exterior of the wellhead and Christmas tree 26. For example, conventional remotely operated submersible vehicles may be used to access and service the valve and control modules 28, 30.

Alternatively, the valve module 28 and/or control module 30 may be positioned internal to the tree 26, above the tree 26, in the annulus 18, attached to or incorporated into the safety valve 12, etc. Any position of the valve module 28 and control module 30 may be used in keeping with the principles of this disclosure.

The valve module 28 includes one or more valves for selectively connecting the line 20 either to a line 32 extending to the pressure source 22, or to a line 34 extending to the annulus 18. In this manner, the line 20 may be placed in fluid communication with either the pressure source 22 or the annulus 18.

When the valve module 28 is operated to place the line 20 in fluid communication with the pressure source 22, the safety valve 12 can be opened in response to pressure greater than annulus pressure being applied from the pressure source to the line 20. When the valve module 28 is operated to place the line 20 in fluid communication with the annulus 18, pressure across the piston in the safety valve 12 is balanced, thereby allowing the biasing device in the safety valve to close the safety valve.

Several significant benefits are achieved through use of the system 10. For example, the biasing device in the safety valve 12 does not have to raise a fluid column all the way from the safety valve to the surface when the safety valve is closed. This reduces the biasing force which must be exerted by the biasing device, thereby also reducing the pressure which must be applied to the line 32 when the safety valve 12 is opened.

As another example, the safety valve 12 can be closed more rapidly, since the fluid in the line 20 does not have to be displaced all the way to the surface through the small line 32. Instead, the fluid in the line 20 can displace the relatively short distance to the valve module 28 and into the annulus 18 through the line 34.

As yet another example, the safety valve 12 can be reliably closed, no matter what pressure exists in the annulus 18, since the valve module 28 ensures that the piston in the safety valve is balanced when the line 20 is placed in fluid communication with the line 34. In contrast, prior annulus-balanced safety valve systems have been dependent upon pressure in the annulus being at a minimum level in order to displace the safety valve piston to a closed position. This minimum level of pressure in the annulus 18 may not exist if, for example, a packer 36 leaks, or the tubular string 14 above the packer leaks.

Figure 2:
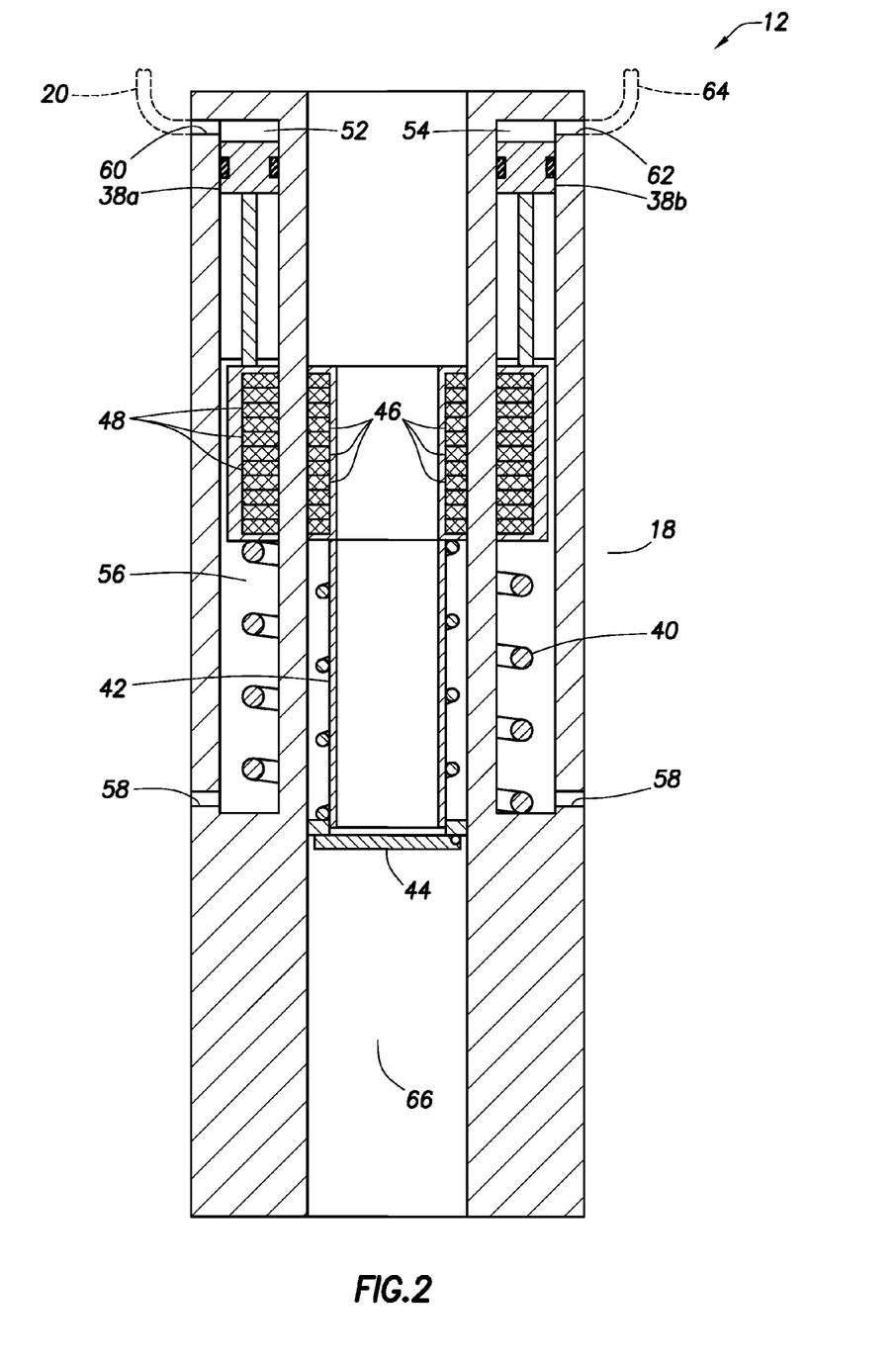
FIG. 2 is an enlarged scale schematic cross-sectional view of a first safety valve which may be used in the system of FIG. 1.

Referring additionally now to FIG. 2, an example of the safety valve 12 which may be used in the system 10 is schematically illustrated. The safety valve 12 as depicted in FIG. 2 is similar in many respects to a safety valve described in U.S. Pat. No. 6,988,556, the entire disclosure of which is incorporated herein by this reference.

The safety valve 12 includes pistons 38a,b, a biasing device 40, an opening prong 42, a closure member 44 and magnets 46 attached to the opening prong. The magnets 46 form a magnetic coupling with magnets 48 attached to the pistons 38a,b. In this manner, the magnetic coupling forces the opening prong 42 to displace with the pistons 38a, 38b.

One significant difference between the safety valve 12 depicted in FIG. 2 and the safety valve described in U.S. Pat. No. 6,988,556 is that the pistons 38a/b are displaceable in response to separate pressure differentials across the pistons. Although only two pistons 38a,b are depicted in FIG. 2, it should be understood that any number of pistons may be used in keeping with the principles of the invention.

One advantage of the multiple separate pistons 38a/b is that one piston 38b (or set of pistons) may serve as a backup or spare, in case the other piston 38a (or set of pistons) becomes inoperable. For this purpose, a chamber 52 exposed to an upper side of the piston 38a is isolated from a chamber 54 exposed to an upper side of the piston 38b.

Lower sides of both pistons 38a,b are exposed to an annular chamber 56, which is in fluid communication with the annulus 18 surrounding the safety valve 12 via openings 58. The upper chamber 52 is in fluid communication with the line 20 via a port 60. The chamber 54 is in fluid communication with another line 64 via a port 62.

The line 64 would preferably be connected to the valve controller 24 (or another similar valve controller, see FIGS. 9A & B and accompanying description of use of separate valve controllers) for use in case the safety valve 12 cannot be operated via pressure manipulation in the line 20. Thus, if the line 20 should develop a leak, or if the piston 38a should leak, etc., the valve 12 can be operated via pressure manipulation in the line 64.

When it is desired to open the valve 12, pressure in the line 20 is increased to a level sufficiently greater than pressure in the annulus 18 to thereby produce a pressure differential across the piston 38a, which overcomes the biasing force exerted by the biasing device 40, and displaces the flow tube 42 downward and opens the closure member 44 to permit fluid flow through an interior flow passage 66 of the tubular string 14. When it is desired to close the valve 12, pressure in the line 20 is decreased to a level low enough to thereby reduce the pressure differential across the piston 38a, which allows the biasing device 40 to displace the opening prong 42 upward, so that the closure member 44 can pivot upward and close off the flow passage 66.

In alternate embodiments, the biasing device 40 could be a spring, pressurized gas chamber or other type of biasing device, the closure member 44 could be a flapper, ball or other type of closure member, the opening prong 42 could be another type of operating member, the pistons 38*a,b* could be utilized simultaneously (i.e., by simultaneous pressure manipulations in the lines 20, 64) or separately, etc. Thus, it should be appreciated that none of the specific details of the construction of the safety valve 12 are required in keeping with the principles of this disclosure. Instead, many different types of safety valves and operating procedures may be used without departing from the principles of this disclosure.

Figure 3A:
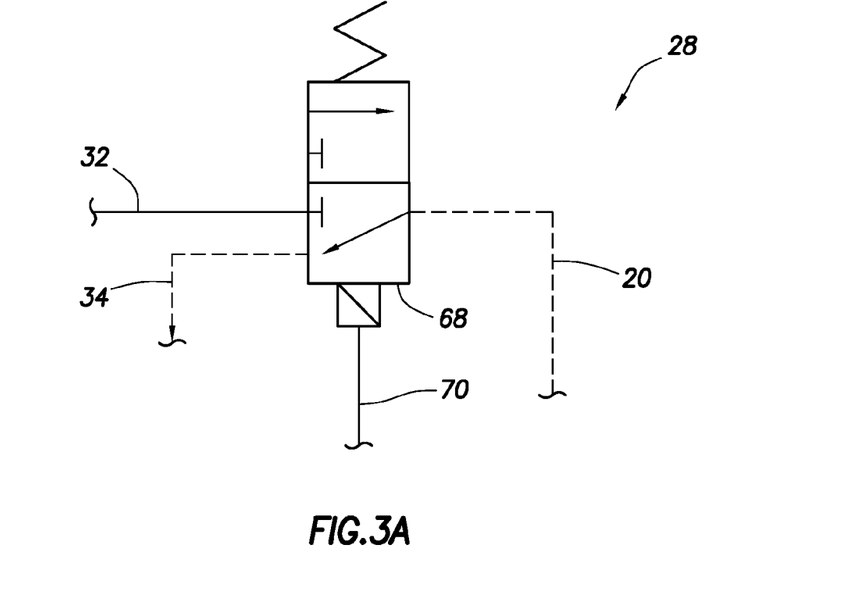
FIGS. 3A & B are schematic views of a first hydraulic circuit which may be used in a valve module in the system of FIG. 1.
Figure 3B:
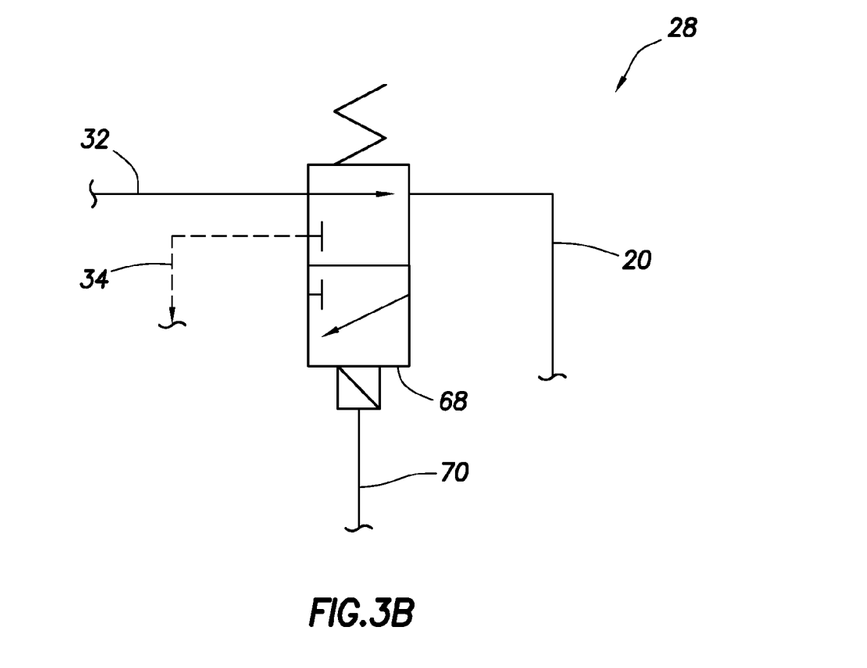

Referring additionally now to FIGS. 3A & B, an example of the valve module 28 is schematically illustrated. In this example, the valve module 28 includes an electrically operated solenoid valve or shuttle valve 68 which is interconnected to the lines 20, 32, 34. An electrical line 70 is connected to the control module 30.

As depicted in FIG. 3A, the valve 68 connects the line 20 to the line 34, thereby balancing pressures in the chambers 52, 56 of the safety valve 12, and allowing the biasing device 40 to close the safety valve. As depicted in FIG. 3B, the valve 68 connects the line 20 to the line 32, thereby allowing increased pressure from the pressure source 22 to be transmitted to the chamber 52 to overcome the biasing force exerted by the biasing device 40 and open the safety valve 12.

The control module 30 can be configured to monitor conditions in the well, and to electrically actuate the valve 68 via the line 70 when an unsafe condition is detected. For example, the control module 30 may include one or more pressure sensors which are used to monitor pressure in the annulus 18 and/or pressure in the tubular string 14. If, for example, a sudden decrease in pressure in the tubular string 14 should occur (e.g., due to severing or other failure in a production pipeline 72), the safety valve 12 can be quickly closed by operating the valve 68 to connect the line 20 to the line 34.

Preferably, the valve 68 is in the configuration of FIG. 3A when an electrical signal is not supplied via the line 70, and the valve 68 is in the configuration of FIG. 3B when the electrical signal is supplied via the line 70. In this manner, the safety valve 12 will close in the event of a failure of the control module 30 to supply the electrical signal.

Alternatively, an electrical signal to shift the valve 68 could be supplied from another source, such as an alternate remote control module, etc. Thus, any source of an electrical signal may be used to shift the valve 68 in keeping with the principles of this disclosure.

Figure 4:
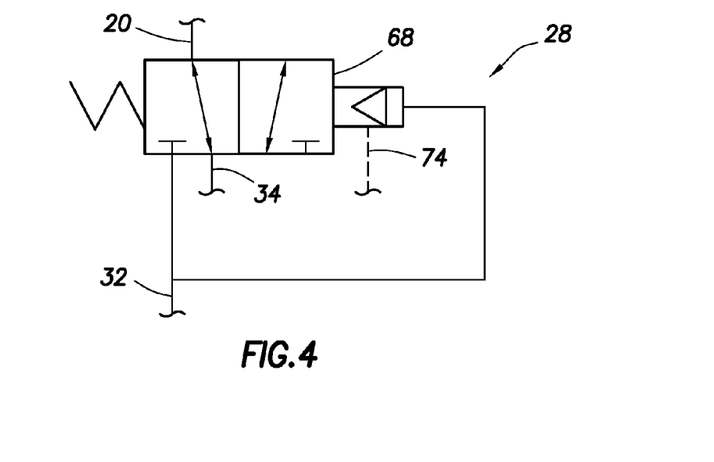
FIG. 4 is a schematic view of a second hydraulic circuit which may be used in the valve module.

Referring additionally now to FIG. 4, another example of the valve module 28 is schematically illustrated. In this example, the valve 68 is hydraulically (instead of electrically) operated. The valve 68 is of the type known as "self-piloted" in that it responds to pressure in one of the lines connected thereto (in this case, the line 32) in order to shift the valve from one configuration to another.

Alternatively, pressure to shift the valve 68 could be supplied from another source, such as an alternate remote pressure source, a local pressure source, etc. Thus, any pressure source may be used to shift the valve 68 in keeping with the principles of this disclosure.

As depicted in FIG. 4, the line 20 is connected by the valve 68 to line 34, thereby balancing pressure between the chambers 52, 56 and allowing the safety valve 12 to close. However, if pressure in the line 32 is increased to a predetermined level, the valve 68 will be actuated to shift to another configuration in which the line 20 is connected to the line 32, thereby allowing the increased pressure to be communicated to the chamber 52 to open the safety valve 12. Preferably, the valve 68 does not shift until there is sufficient pressure in the line 32 to open the safety valve 12 against the biasing force exerted by the biasing device 40 and any other force (such as friction forces, forces needed to displace the closure member 44, etc.) resisting displacement of the opening prong 42 to the open position.

If pressure in the line 32 is subsequently decreased sufficiently below the predetermined level, the valve 68 will shift back to the configuration depicted in FIG. 4, allowing the safety valve 12 to close. Thus, the safety valve 12 fails closed in the event of loss of pressure in the line 32.

A vent or reference pressure 74 may be used to control how the predetermined level is referenced. For example, the reference pressure 74 could be atmospheric pressure, in which case the predetermined level of pressure in the line 32 would be measured as gauge pressure above atmospheric pressure at the valve 68.

As another example, the reference pressure 74 could be pressure in the annulus 18, in which case the predetermined level of pressure in the line 32 would be measured as pressure above that of the pressure in the annulus. Preferably, in the system 10, the reference pressure 74 is sea pressure (i.e., hydrostatic pressure due to the sea water above the valve module 28).

Figure 5:
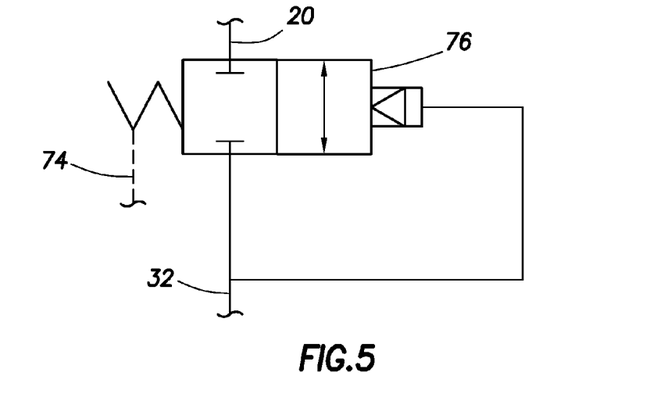
FIGS. 5 & 6 are schematic views of third and fourth hydraulic circuits which may be combined for use in the valve module.
Figure 6:
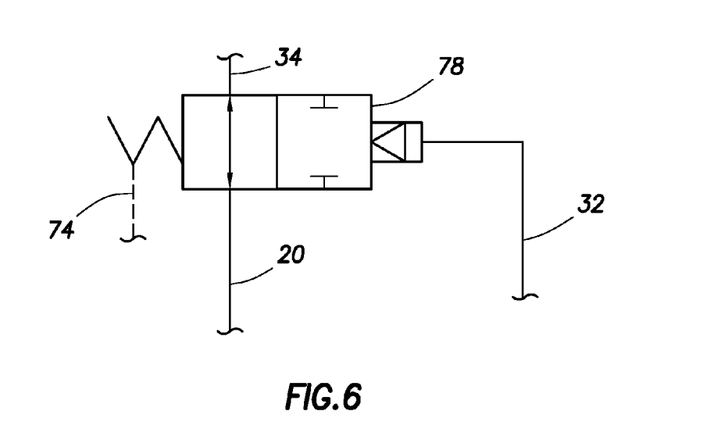

Any number or type of valves may be used in the valve module 28. In FIGS. 5 & 6, a normally-closed self-piloted hydraulically actuated valve 76 and a normally-open self-piloted hydraulically actuated valve 78 are schematically illustrated.

Figure 7:
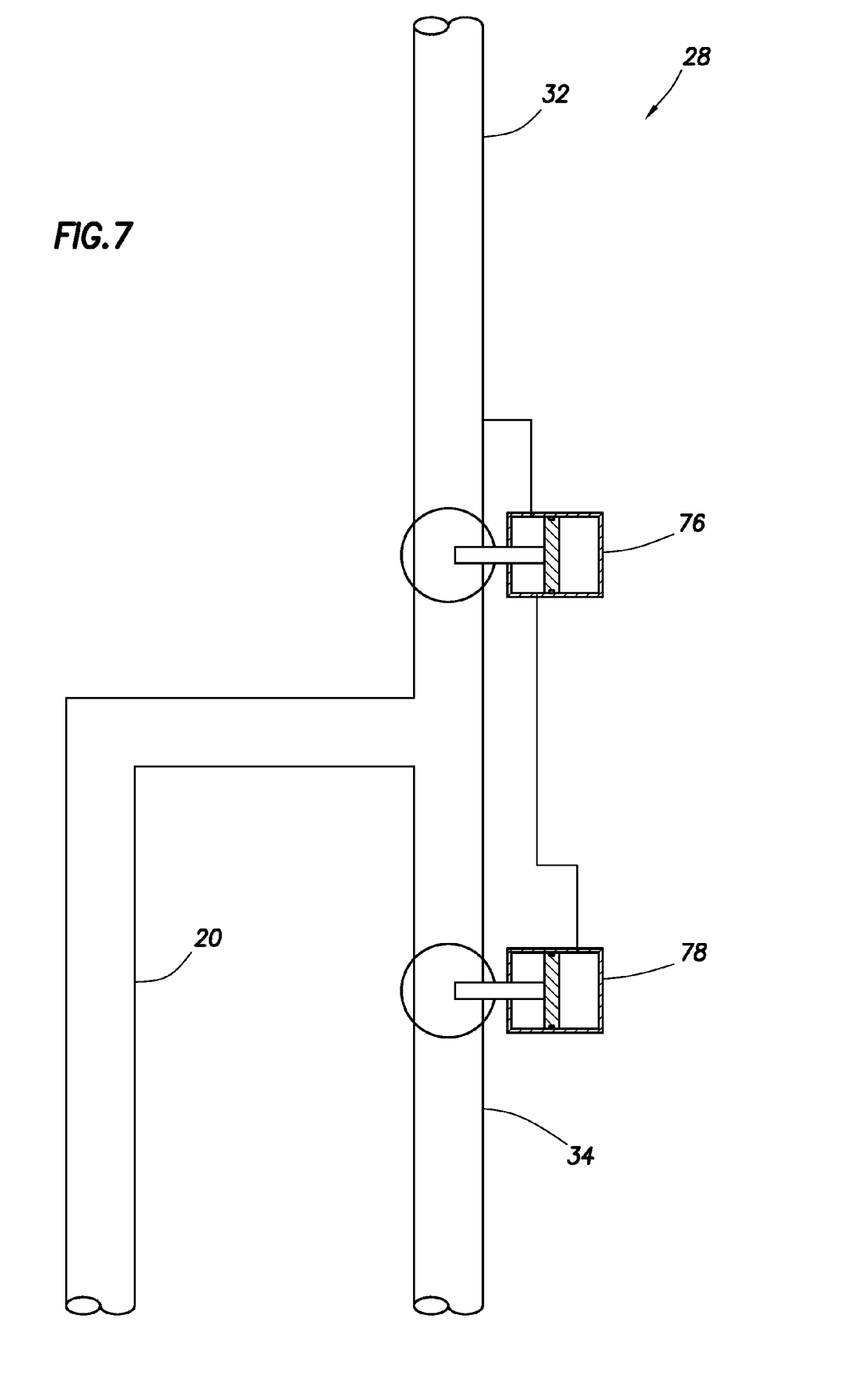
FIG. 7 is a schematic view of the combined third and fourth hydraulic circuits combined in the valve module.

These valves 76, 78 may be interconnected to each other and the lines 20, 32, 34 in an example of the valve module 28 schematically depicted in FIG. 7. Of course, other types of normally-open and/or normally-closed hydraulically or electrically operated valves may be used in place of the valves 76, 78, if desired.

As depicted in FIG. 7, pressure in the line 32 is below a predetermined level and, thus, valve 76 is closed and valve 78 is open. Preferably, the valves 76, 78 are configured so that the valve 76 closes before the valve 78 opens. In this configuration, the line 20 is in communication with line 34, thereby balancing pressure in the chambers 52, 56 and allowing the safety valve 12 to close.

Although the example of FIG. 7 uses pressure in the line 32 for piloting the valves 76, 78, pressure to shift the valves could be supplied from another source, such as an alternate remote pressure source, a local pressure source, etc. Thus, any pressure source may be used to shift the valves 76, 78 in keeping with the principles of this disclosure.

In the example depicted in FIG. 7, if pressure in the line 32 is increased to the predetermined level, the valve 78 will close and the valve 76 will open, thereby applying the increased pressure in the line 32 to the chamber 52 and opening the safety valve 12. Preferably, the valve 76 does not open until there is sufficient pressure in the line 32 to open the safety valve 12 against the biasing force exerted by the biasing device 40 and any other force resisting displacement of the opening prong 42 to the open position.

If pressure in the line 32 is subsequently decreased sufficiently below the predetermined level, the valve 76 will close and the valve 78 will open, again balancing pressures in the chambers 52, 56 and allowing the safety valve 12 to close. Thus, the valve module 28 of FIG. 7 operates in response to pressure manipulation in the line 32 in much the same manner as the valve module of FIG. 4.

Figure 8:
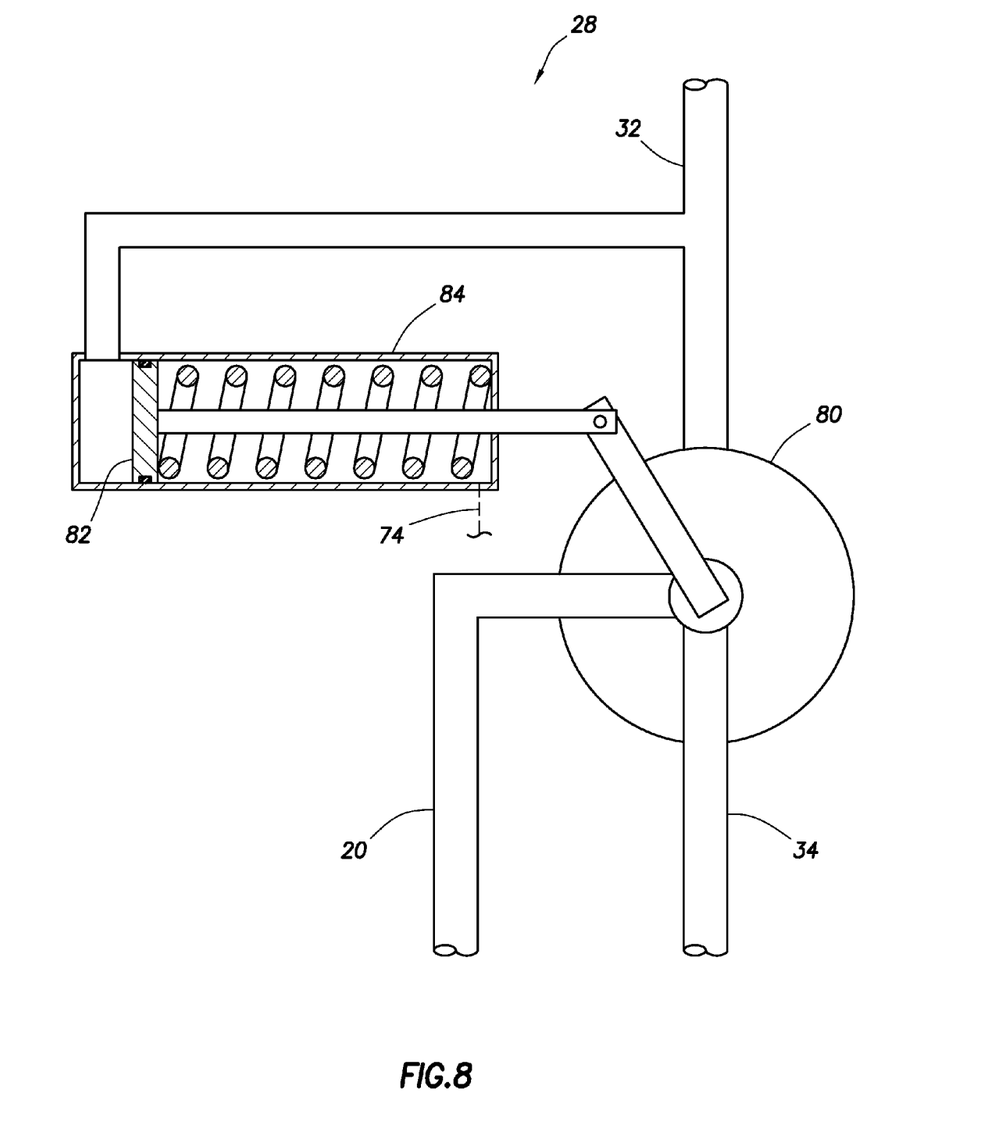
FIG. 8 is a schematic view of a fifth hydraulic circuit which may be used in the valve module.

Referring additionally now to FIG. 8, yet another example of the valve module 28 is schematically illustrated. In this example, the valve module 28 includes a rotary valve 80 which is hydraulically actuated and self-piloted.

As depicted in FIG. 8, the line 20 is connected by the valve 80 to line 34, thereby balancing pressure between the chambers 52, 56 and allowing the safety valve 12 to close. However, if pressure in the line 32 is increased to a predetermined level, the valve 80 will be actuated to rotate to another configuration (i.e., by displacing a piston 82 of an actuator 84 to the right as viewed in FIG. 8) in which the line 20 is connected to the line 32, thereby allowing the increased pressure to be communicated to the chamber 52 to open the safety valve 12.

If pressure in the line 32 is subsequently decreased below the predetermined level, the valve 80 will rotate back to the configuration depicted in FIG. 8, allowing the safety valve 12 to close. Thus, the safety valve 12 fails closed in the event of loss of pressure in the line 32.

As with the other examples described above, pressure to actuate the valve 80 could be supplied from a source other than the line 32, such as an alternate remote pressure source, a local pressure source, etc. Thus, any pressure source may be used to shift the valve 80 in keeping with the principles of this disclosure.

Figure 9A:
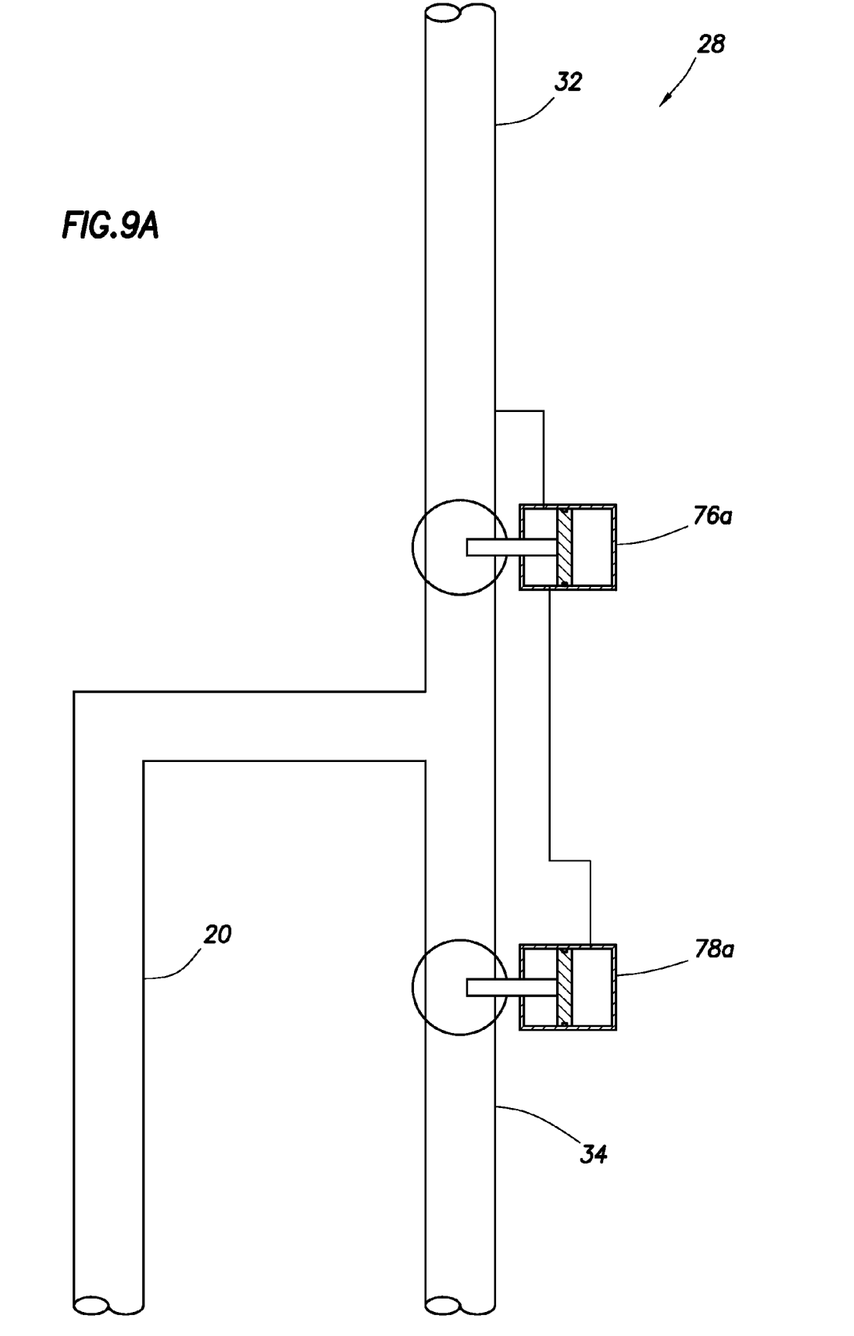
FIGS. 9A & B are schematic views of a sixth hydraulic circuit which may be used in the valve module.
Figure 9B:
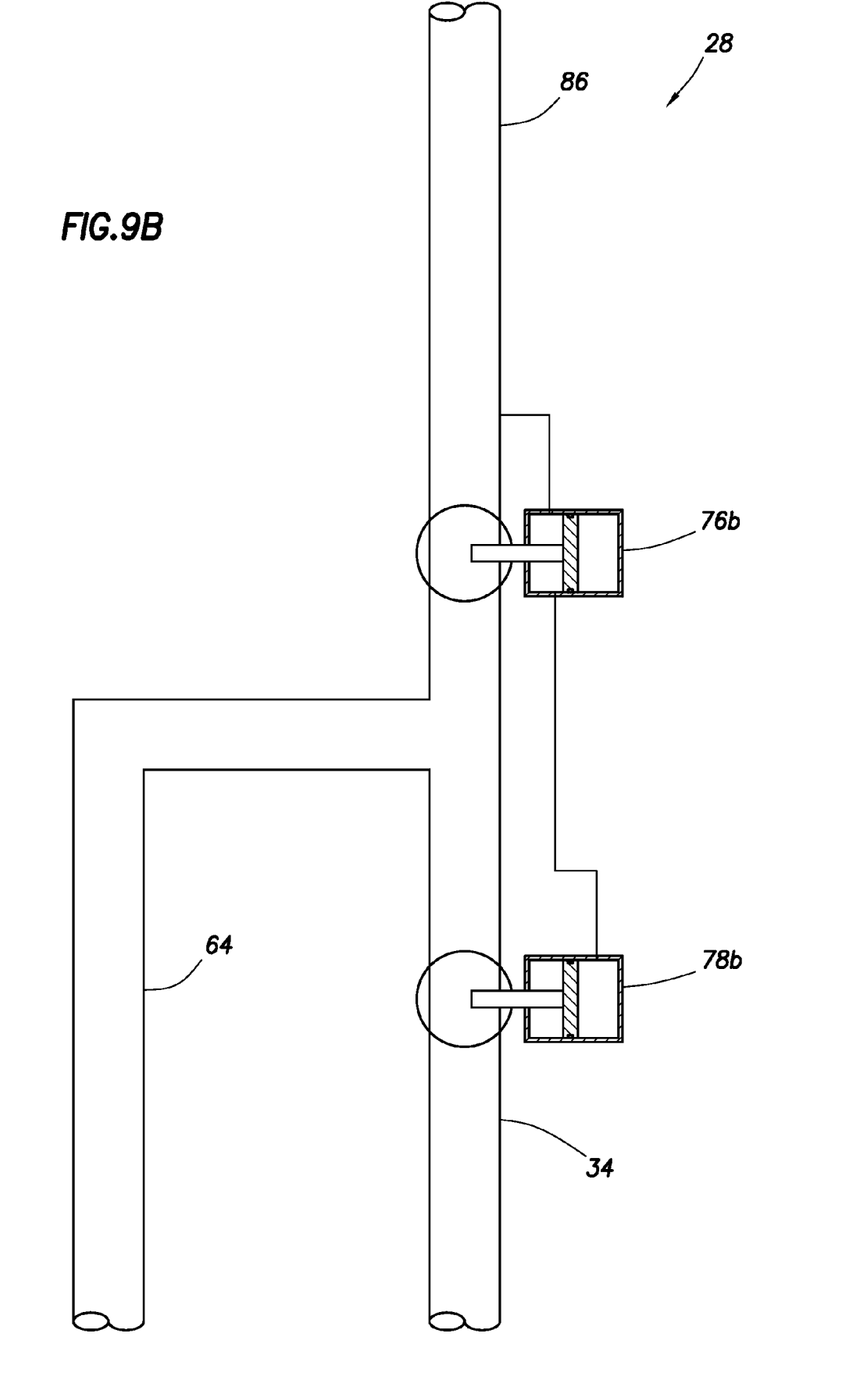

Representatively illustrated in FIGS. 9A & B is a manner of switching between actuator pistons 38a,b in the safety valve 12, so that the safety valve may continue to be operated by one of the pistons even if it cannot be operated by the other piston.

The valve module 28 in this example includes two sets of the normally-closed and normally-open valves 76a,b 78a,b. In FIG. 9A, the valves 76a, 78a are used to control fluid communication between the line 20 and either the line 20 or the line 34, in the same manner as illustrated in FIG. 7 and described above.

However, if the safety valve 12 can no longer be operated using the piston 38a, pressure in the line 20 can be decreased below the predetermined pressure, thereby providing communication between the lines 20, 34, balancing pressure across the piston 38a, and enabling fluid to be flowed between the lines 20, 34 as the piston 38a displaces upward and downward when the safety valve 12 is operated using the other piston 38b (which is displaced in response to pressure manipulation in the line 64).

To operate the safety valve 12 using the other piston 38b, pressure in another line 86 (similar to the line 32 and connected to the pressure source 22 or another pressure source) is increased to the predetermined level in order to open the valve 76b and close the valve 78b. Preferably, the valves 76b, 78b are configured so that the valve 78b closes before the valve 76b opens. The line 86 is thereby connected to the line 64 which is in communication with the chamber 54 in the safety valve 12, permitting a pressure differential across the piston 38b to displace the piston and open the safety valve.

Pressure in the line 86 may be subsequently decreased below the predetermined level, thereby closing the valve 76b and opening the valve 78b, and permitting the biasing force exerted by the biasing device 40 to displace the piston 38b upward to close the safety valve 12. Thus, pressure manipulations in the line 86 may be used to operate the safety valve 12 in the same manner as pressure manipulations in the line 32 may be used to operate the safety valve, as described above.

Figure 10:
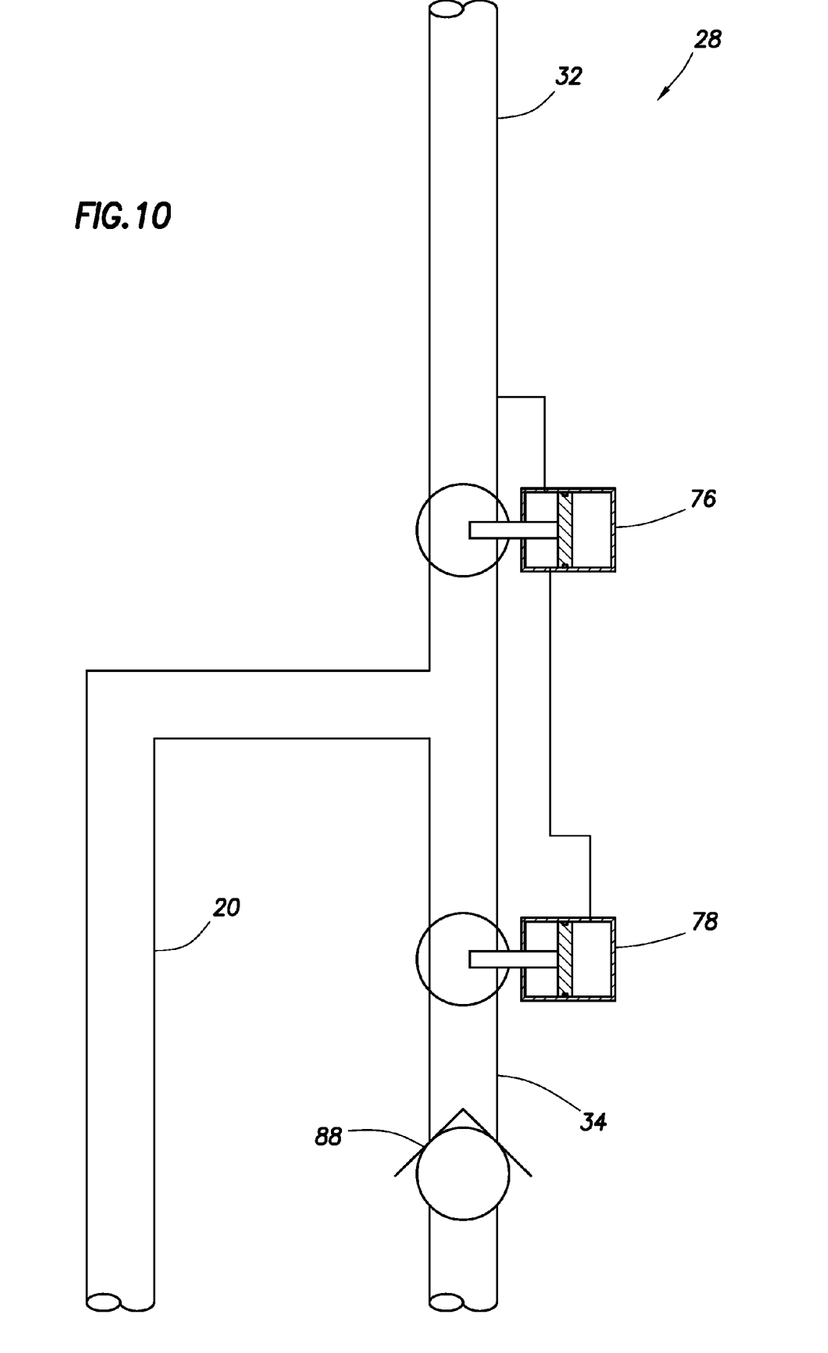
FIG. 10 is a schematic view of a seventh hydraulic circuit which may be used in the valve module.

Referring additionally now to FIG. 10, the valve module 28 of FIG. 7 is schematically illustrated with a check valve 88 interconnected in the line 34. The check valve 88 allows fluid in the line 34 to be "flushed" each time the safety valve 12 is closed (due to fluid transfer from the line 20 to the line 34), while providing an additional barrier to release of pressure from the annulus 18 to the sea in subsea installations, or to the atmosphere in land installations.

Figure 11:
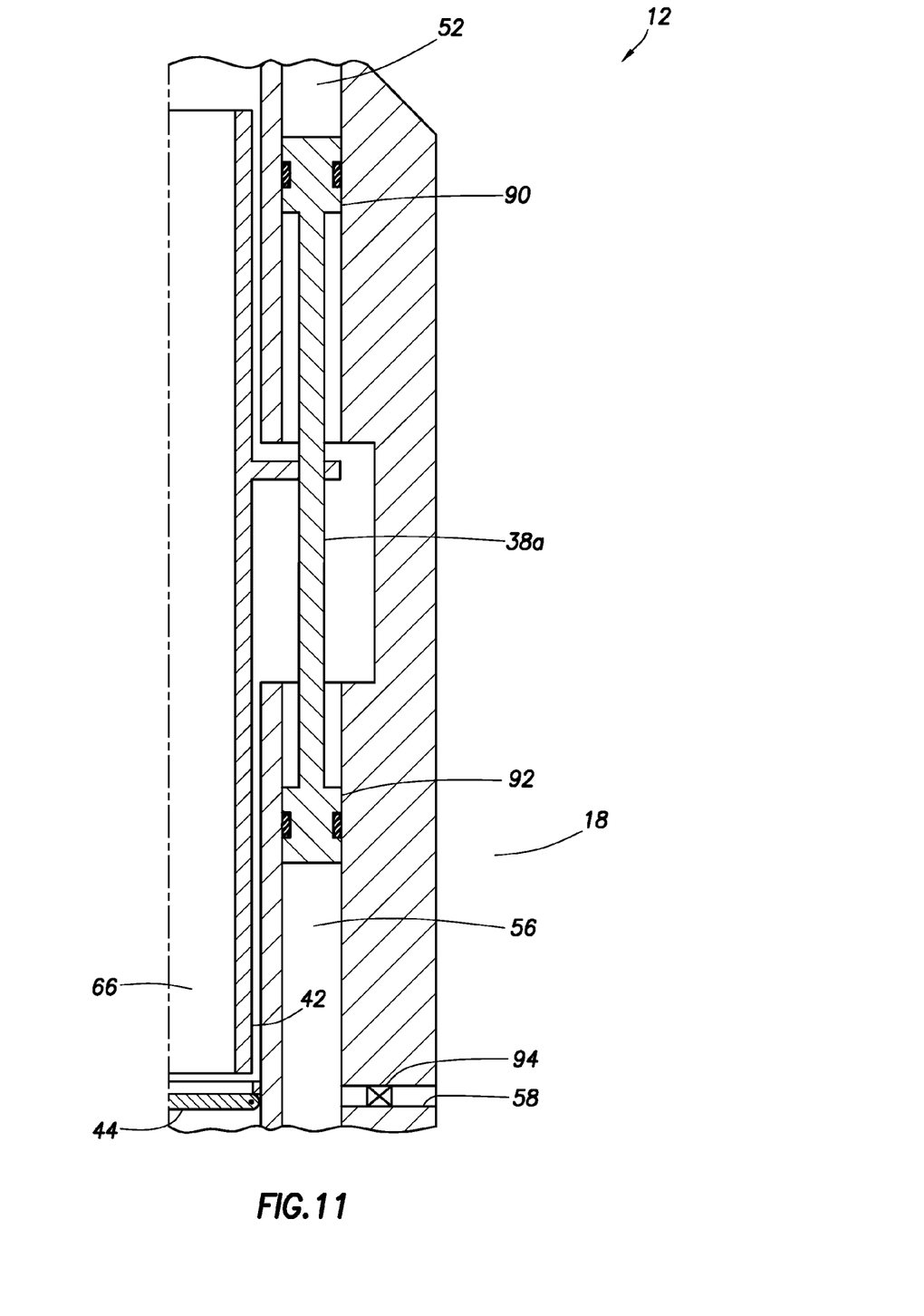
FIG. 11 is a schematic cross-sectional view of a portion of an alternate construction of the safety valve which may be used in the system of FIG. 1.

Referring additionally now to FIG. 11, another example of the safety valve 12 is schematically illustrated. Elements of the safety valve 12 of FIG. 11 which are somewhat similar to elements of the safety valve as illustrated in FIG. 2 are indicated in FIG. 11 using the same reference numbers.

The safety valve 12 of FIG. 11 is similar in configuration to a type of safety valve known as a "dome charge" valve. In a dome charge valve, the biasing device which biases the opening prong 42 upward to close the safety valve comprises a pressurized gas (such as Nitrogen) in the chamber 56. This pressurized gas biases the piston 38a to displace upward when pressure in the chamber 52 is less than pressure in the chamber 56. Prior to installing the safety valve 12 in the well, the gas in the chamber 56 would typically be greater than expected well pressure at the safety valve after installation.

The piston 38a in this configuration can be considered an assembly including an upper piston 90 and a lower piston 92. A lower side of the upper piston 90 is balanced relative to an upper side of the lower piston 92, in that both are exposed to pressure in the flow passage 66. The upper side of the piston 90 is exposed to pressure in the chamber 52, and the lower side of the piston 92 is exposed to pressure in the chamber 56, so the piston 38a assembly still responds to a pressure differential applied between the chambers 52, 56 as in the safety valve 12 of FIG. 2.

If pressure in the chamber 56 cannot be maintained, for example, due to leakage of the pressurized gas from the chamber, etc., the opening 58 may be opened to permit fluid communication between the chamber 56 and the annulus 18 surrounding the safety valve 12. In this manner, the safety valve 12 of FIG. 11 could be operated using the valve controller 24 and lines 20, 32, 34 as described above.

The opening 58 may be opened using, for example, a valve or openable plug 94 which can be opened when the chamber 56 is no longer pressurized by the pressurized gas. In this manner, a dome charge-type safety valve can be converted to an annulus-balanced safety valve in a well, without expending time and expense retrieving the safety valve from the well and converting it at the surface, or repairing or replacing the safety valve.

Alternatively, the safety valve 12 can be originally installed as an annulus-balanced safety valve with the opening 58 open (i.e., without use of the valve or openable plug 94). The safety valve 12 of FIG. 11 may be provided with a biasing device 40 (such as a spring) to upwardly bias the piston 38a and/or the opening prong 42, whether or not pressurized gas is used in the chamber 56.

Note that the piston 38a is connected directly to the opening prong 42 in the safety valve 12 of FIG. 11, without use of the magnetic coupling of FIG. 2 described above. However, the safety valve 12 of FIG. 11 could be provided with a magnetic coupling to force the opening prong 42 to displace with the piston 38a, if desired.

Although only two configurations of the safety valve 12 have been described above, it should be clearly understood that any type of safety valve may be used in keeping with the principles of this disclosure. For example, a tubing pressure-balanced safety valve could be used, in which case the line 34 and chamber 56 could be connected to the flow passage 66 of the tubular string 14, and the valve module 28 could alternately communicate the line 20 and chamber 52 to the line 32 or the line 34.

The annulus 18 and the flow passage 66 of the tubular string 14 are examples of sources of well pressure which may be used in the system 10. Other sources of well pressure may be used in keeping with the principles of this disclosure.

It may now be fully appreciated that the above disclosure provides several substantial benefits to the art of controlling safety valves in subterranean wells. The system 10 and associated methods described above enable a safety valve to be conveniently and economically controlled without requiring excessively high pressure to be applied to the safety valve to overcome a large biasing force exerted by a biasing device of the safety valve. The system 10 also balances pressure across a piston of the safety valve quickly when it is desired to close the valve, no matter the level of pressure in the annulus or other well pressure source.

In particular, the system 10 for operating a safety valve 12 in a subterranean well has been described above. The system 10 includes pistons 38a,b of the safety valve 12, with the pistons being responsive to displace due to a pressure differential between chambers 52, 54, 56 exposed to the pistons 38a,b. The system 10 further includes a valve controller 24 which alternately exposes the chamber 52 and/or 54 to pressure in an annulus 18 surrounding the safety valve 12, and to pressure greater than that in the annulus 18.

The chamber 56 may be exposed to the pressure in the annulus 18. The safety valve 12 may close in response to each of the chambers 52, 54, 56 being exposed to the pressure in the annulus 18.

The safety valve 12 may open in response to the chamber 52 and/or 54 being exposed to the pressure greater than that in the annulus 18, and the chamber 56 being exposed to the pressure in the annulus 18.

The valve controller 24 may include a control module 30 responsive to pressure variation in the system 10. The valve controller 24 may further include a valve module 28 operated by the control module 30 and interconnected to the chamber 52 and/or 54, the annulus 18 and a source 22 of the pressure greater than that in the annulus 18.

The valve controller 24 may be responsive to pressure in a line 32 connected to the valve controller, whereby the valve controller connects the chamber 52 and/or 54 to the pressure greater than that in the annulus 18 in response to a predetermined level of the pressure in the line. The valve controller 24 may connect the chamber 52 and/or 54 to pressure in the annulus 18 in response to a predetermined decrease in the pressure in the line 32.

A method of operating a safety valve 12 in a subterranean well is also described above. The method may include the steps of: opening the safety valve 12 by biasing a piston 38a,b of the safety valve to displace in response to a pressure differential between a chamber 52 and/or 54 exposed to pressure greater than a well pressure, and a chamber 56 exposed to well pressure; and closing the safety valve 12 by exposing each of the chambers 52, 54, 56 to the well pressure.

The well pressure may be pressure in an annulus 18 surrounding the safety valve 12. The opening step may also include operating a valve controller 24 to connect the chamber 52 and/or 54 to the pressure greater than the well pressure, and the closing step may also include operating the valve controller 24 to connect the chamber 52 and/or 54 to the well pressure.

The method may include the step of utilizing a control module 30 of the valve controller 24 to monitor the well pressure. The control module 30 may operate a valve module 28 of the valve controller 24 in response to a variation in the well pressure.

The method may include the step of connecting the valve module 28 to the chamber 52 and/or 54, the well pressure, and the pressure greater than the well pressure.

The method may further include the step of exposing the chamber 56 to the well pressure only after positioning the safety valve 12 in the well. The method may also include the step of filling the chamber 56 with pressurized gas at a pressure greater than the well pressure prior to the step of positioning the safety valve 12 in the well.

A system for operating a safety valve 12 in a subterranean well may comprise a piston 38a and/or 38b of the safety valve 12 displaceable in response to a pressure differential between chambers 52, 54, 56 exposed to the piston. The chamber 52 and/or 54 may be connected to a valve controller 24. The chamber 56 may be connected to a well pressure. The valve controller 24 may be connected to the well pressure and to a pressurized fluid source 22 which supplies pressure greater than that of the well pressure. The valve controller 24 may be operative to alternately connect the chamber 52 and/or 54 to the well pressure and to the pressurized fluid source 22, to thereby alternately open and close the safety valve 12.

The well pressure may be pressure in an annulus 18 surrounding the safety valve 12. The safety valve 12 may open in response to the chamber 52 and/or 54 being exposed to the pressurized fluid source 22, and the safety valve may close in response to the chamber 52 and/or 54 being exposed to the well pressure.

The valve controller 24 may include a control module 30 responsive to pressure variation in the well, and the valve controller may further include a valve module 28 operated by the control module and interconnected to the chamber 52 and/or 54, the well pressure and the pressurized fluid source 22.

The valve controller 24 may be responsive to pressure in a line 32 connected to the valve controller, whereby the valve controller connects the chamber 52 and/or 54 to the pressurized fluid source 22 in response to a predetermined level of pressure in the line 32. The valve controller 24 may connect the chamber 52 and/or 54 to the well pressure in response to a predetermined decrease in the pressure in the line 32.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A system for operating a safety valve in a subterranean well, the system comprising:
   a piston of the safety valve, the piston being responsive to displace due to a pressure differential between first and second chambers exposed to the piston; and
   a valve controller which alternately exposes the first chamber to pressure in an annulus surrounding the safety valve, and to pressure greater than that in the annulus, the valve controller being remotely positioned from the safety valve.

2. The system of claim 1, wherein the second chamber is exposed to the pressure in the annulus.

3. The system of claim 1, wherein the safety valve closes in response to both of the first and second chambers being exposed to the pressure in the annulus.

4. The system of claim 1, wherein the safety valve opens in response to the first chamber being exposed to the pressure greater than that in the annulus, and the second chamber being exposed to the pressure in the annulus.

5. The system of claim 1, wherein the valve controller includes a control module and a valve module, the control module being operative to monitor pressure in the well and to operate the valve module in response to a variation in the well pressure.

6. The system of claim 1, wherein the valve controller is responsive to pressure in a line connected to the valve controller, whereby the valve controller connects the first chamber to the pressure greater than that in the annulus in response to a predetermined level of the pressure in the line.

7. The system of claim 6, wherein the valve controller connects the first chamber to pressure in the annulus in response to a predetermined decrease in the pressure in the line.

8. A method of operating a safety valve in a subterranean well, the method comprising the steps of:
   opening the safety valve by biasing a piston of the safety valve to displace in response to a pressure differential between a first chamber exposed to pressure greater than a pressure in the well, and a second chamber exposed to the well pressure; and
   closing the safety valve by exposing both of the first and second chambers to the well pressure utilizing a valve controller remotely positioned from the safety valve.

9. The method of claim 8, wherein the well pressure is pressure in an annulus surrounding the safety valve.

10. The method of claim 8, wherein the opening step further comprises operating the valve controller to connect the first chamber to the pressure greater than the well pressure, and wherein the closing step further comprises operating the valve controller to connect the first chamber to the well pressure.

11. The method of claim 10, wherein the valve controller includes a control module and a valve module, and further comprising the step of utilizing the control module to monitor the well pressure, the control module operating the valve module in response to a variation in the well pressure.

12. The method of claim 11, further comprising the step of connecting the valve module to the first chamber, the well pressure, and the pressure greater than the well pressure.

13. The method of claim 8, further comprising the step of exposing the second chamber to the well pressure only after the safety valve is in place in the well.

14. The method of claim 13, further comprising the step of filling the second chamber with pressurized gas at a pressure greater than the well pressure prior to positioning the safety valve in the well.

15. A system for operating a safety valve in a wellbore of a subterranean well, the system comprising:
   a piston of the safety valve displaceable in response to a pressure differential between first and second chambers exposed to the piston;
   the first chamber connected to a valve controller outside of the wellbore;
   the second chamber connected to a pressure in the well;
   the valve controller connected to the well pressure;
   the valve controller connected to a pressurized fluid source which supplies pressure greater than that of the well pressure; and
   the valve controller being operative to alternately connect the first chamber to the pressurized fluid source and to the well pressure, to thereby alternately open and close the safety valve.

16. The system of claim 15, wherein the well pressure is pressure in an annulus surrounding the safety valve.

17. The system of claim 15, wherein the safety valve opens in response to the first chamber being exposed to the pressurized fluid source, and wherein the safety valve closes in response to the first chamber being exposed to the well pressure.

18. The system of claim 15, wherein the valve controller includes a control module and a valve module, the control module being operative to monitor the well pressure and to operate the valve module in response to a variation in the well pressure.

19. The system of claim 15, wherein the valve controller is responsive to pressure in a line connected to the valve controller, whereby the valve controller connects the first chamber to the pressurized fluid source in response to a predetermined level of pressure in the line.

20. The system of claim 19, wherein the valve controller connects the first chamber to the well pressure in response to a predetermined decrease in the pressure in the line.

* * * * *